(12) United States Patent
Sibbald

(10) Patent No.: US 7,177,433 B2
(45) Date of Patent: Feb. 13, 2007

(54) METHOD OF IMPROVING THE AUDIBILITY OF SOUND FROM A LOUDSPEAKER LOCATED CLOSE TO AN EAR

(75) Inventor: Alastair Sibbald, Maidenhead (GB)

(73) Assignee: Creative Technology Ltd, Singapore (SG)

( * ) Notice: Subject to any disclaimer, the term of this patent is extended or adjusted under 35 U.S.C. 154(b) by 403 days.

(21) Appl. No.: 10/220,722

(22) PCT Filed: Mar. 7, 2001

(86) PCT No.: PCT/GB01/00984

§ 371 (c)(1),
(2), (4) Date: Dec. 18, 2002

(87) PCT Pub. No.: WO01/67433

PCT Pub. Date: Sep. 13, 2001

(65) Prior Publication Data

US 2003/0185403 A1  Oct. 2, 2003

(30) Foreign Application Priority Data

Mar. 7, 2000   (GB)   ................................. 0005334.8

(51) Int. Cl.
*A61F 11/06* (2006.01)
*G10K 11/16* (2006.01)
*H03B 29/00* (2006.01)
*H04R 1/10* (2006.01)

(52) U.S. Cl. .......................... 381/71.6; 381/72; 381/74

(58) Field of Classification Search ............... 381/71.6, 381/74, 71.1, 72, 317, 318, 57, 73.1, 384, 381/372

See application file for complete search history.

(56) References Cited

U.S. PATENT DOCUMENTS

| 5,251,263 | A | * | 10/1993 | Andrea et al. | ............. 381/71.6 |
| 5,416,846 | A | * | 5/1995 | Tamura et al. | ............. 381/71.8 |
| 5,481,615 | A | | 1/1996 | Eatwell et al. | |
| 5,689,572 | A | | 11/1997 | Ohki et al. | |
| 5,751,815 | A | * | 5/1998 | Philp et al. | ................... 381/17 |
| 5,852,667 | A | | 12/1998 | Pan et al. | |
| 6,118,878 | A | * | 9/2000 | Jones | .......................... 381/72 |
| 6,278,786 | B1 | * | 8/2001 | McIntosh | ................... 381/71.6 |

FOREIGN PATENT DOCUMENTS

EP   0 192 379 A2   8/1986

OTHER PUBLICATIONS

Carme, C., *Absorption Acoustic Active Dans le Cavites Auditives*, Acustica, Oct. 1998, p. 233-246, vol. 66, No. 5, FRANCE.

* cited by examiner

*Primary Examiner*—Xu Mei
(74) *Attorney, Agent, or Firm*—Russell N. Swerdon

(57) ABSTRACT

A method and apparatus for improving the audibility of sound from a loudspeaker located close to an ear, comprises the steps of detecting ambient acoustic noise arriving from other sound sources using a transducer that provides corresponding ambient sound signals, inverting the polarity of said ambient sound signals and combining them with the signals being fed to the loudspeaker to reduce the audibility of said ambient acoustic noise, and passing said ambient sound signals through a filter having a predetermined average transfer function that compensates for the spectral modification of sounds travelling from the loudspeaker to the ear caused by the proximity of the ear of a listener in use.

11 Claims, 5 Drawing Sheets

METHOD OF IMPROVING THE AUDIBILITY OF SOUND FROM A LOUDSPEAKER LOCATED CLOSE TO AN EAR

BACKGROUND OF THE INVENTION

1. Field of the Invention

The present invention relates to a method of improving the audibility of sound from a loudspeaker located close to an ear. It relates particularly, though not exclusively, to an improved method of providing acoustic noise reduction in telephones and headphones, such that the listener can perceive the transmitted sounds more effectively in a noisy environment. It also relates to apparatus for use in the method.

2. Discussion of the Related Art

The principle of acoustic noise cancellation is well known. The unwanted, incoming noise signal is received by a transducer such as a microphone; the resultant signal is inverted and broadcast via a loudspeaker, or similar actuator, so as to combine with the original acoustic noise signal at a point set slightly apart from the pickup microphone. (The paper "The active control of sound", S J Elliott and P A Nelson, Electronics and Communication Engineering Journal, August 1990, pp. 127–136, contains a useful reference listing.) It has been employed with varying success over many years for a variety of applications. For example, it has been speculated that large-scale noise cancellation might be used to quiet industrial office environments, but with little success. The problem is that whilst it is theoretically possible to cancel noise at a single point in space, the cancellation does not persist at other points in space because the magnitude and phase of the unwanted signals cannot be matched. Indeed, the cancellation signal itself contributes to the overall noise level away from the cancellation spot.

Known noise-reduction systems can be divided into two categories: (a) systems based on loudspeakers located far from the ear, and (b) systems based on loudspeakers located close to or adjacent the ear (including headphone-based systems, such as that disclosed in WO95/00946). The present invention relates to the latter category.

In the early 1990s, car makers were considering building noise-cancellation systems into the headrests of their cars. This is a sensible approach, because the cancellation spot is well-defined (i.e., at each respective ear of the driver), and directly accessed by a loudspeaker several inches away, such that the magnitude and phase of the signals arriving at the ear are well-defined. A similar system was contemplated for aircraft.

In general, low frequency noises are easier to cancel than high frequency ones, because the wavelengths are longer and hence the amplitude of the wave does not change as much per unit distance as it does for short wavelengths.

More recently, Sony have introduced noise-cancelling headphones under the WARP trademark in Japan. WARP stands for Wave Adaptive Reduction Principle. These are available in two forms: (a) conventional circumaural style, where the driver unit sits on a padded collar which lies around the edge of the pinna, and (b) in-ear style. More recently, Sony have also introduced a "pad-on-ear" type headphone (model MDR-NC5).

Other, similar products are made by, for example, Sennheiser, NCT, and Koss. Sennheiser manufacture several types of active, noise-cancelling headphones, such as their HDC 451, and NCT (of Stamford, USA) have a "Noise-buster" headphone system.

FIG. 1 shows a known means of acoustic noise-reduction, comprising a headphone driver unit (one of a pair), mounted in a headphone shell, together with an outer, noise-pickup microphone. The microphone registers the background noise on the outer side of the headphone shell assembly, and feeds an inverting amplifier. The output from this inverting amplifier is added to (i.e., summed with) the music signals at the headphone driver stage, such that the resultant noise-related signal on the inside of the headphone shell is equal and opposite to that of the background noise which permeates directly through and around the headphone shell.

SUMMARY OF THE INVENTION

In order to allow for the variations in sound transmission through and around the shell (owing to the fit on the listener's head, ears and other factors), it is useful to provide a variable amount of the noise-cancellation signal such that the user can control and optimise the performance of the noise-reduction by adjusting a potentiometer or similar device. This method assumes that the microphone is close to the noise-cancelling acoustic driver unit (the headphone actuator). If the microphone were to be located elsewhere, away from the headphone shell, then the noise-cancelling signal would be different from the noise-to-be-cancelled in the shell, and so the effectiveness would be degraded. In fact, in the extreme, the noise level would be increased.

According to a first aspect of the present invention there is provided a method as specified in claims 1–5. According to a second aspect of the invention there is provided apparatus as claimed in claims 6–9. According to a third aspect of the invention there is provided a system for programming the transfer function of a programmable filter in a noise reduction system as claimed in claim 10.

The present invention is an improved method of providing ambient acoustic noise-reduction in telephones (such as for example cordless or mobile or cellular phones, or conventional phones) and headphones, such that the listener can perceive the transmitted sounds more effectively in a noisy environment. It is based on the recognition that both the incoming noise signals, and the acoustic signal produced by the phone transducer, are acoustically modified by the proximity of the head and ears to the loudspeaker or earphone. The invention provides a method for compensating for these effects.

A further aspect of the invention provides means to "customise" the compensating parameters, so as to match optimally the individual physical and/or physiological characteristics of a given listener.

It has been assumed in the prior art that the noise signal outside the headphone shell and the broadcast signal inside the headphone shell are linearly related, that is, they are related purely by a gain factor. It is shown below that this assumption is not valid.

It also seems to be common practise for manufacturers to "roll-off" the high frequency content of the noise-cancellation signal, limiting the cancellation range of frequencies to below 1 kHz. This can be seen in their specification sheets. It is often the lower frequencies which are troublesome, firstly, because this is the nature of much industrial noise (in an aircraft cabin, for example), and secondly, because LF noise permeates and penetrates structures more than high-frequency (HF) noise, because it diffracts readily around body-sized artifacts and does not reflect or scatter so readily).

Although prior-art noise-cancelling headphones can be fairly effective at sub-1 kHz frequencies, they are nevertheless far from efficient, because much of the irritating, ambient noise lies in the range 500 Hz to 5 kHz. The present invention can mitigate this problem, and affords the means to reduce or cancel noise frequencies up to 5 kHz or more.

Embodiments of the invention will now be described, by way of example only, with reference to the accompanying schematic drawings, in which

DETAILED DESCRIPTION OF THE PREFERRED EMBODIMENTS

The acoustic modifications that the incoming noise signals (and the signals transmitted by the phone transducer) are subject to, will first be described. As far as the inventor is aware, neither of these phenomena have been considered before in the context of noise-cancellation.

Figure 1:
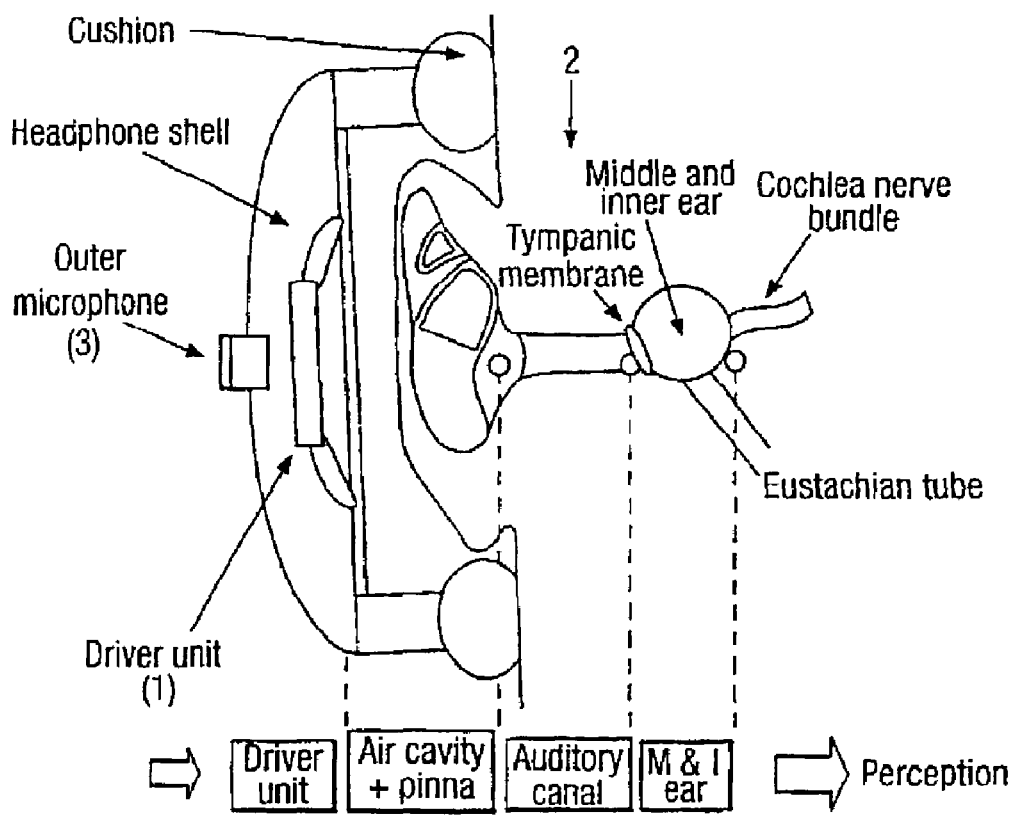
FIG. 1 shows a prior art acoustic noise reduction system.

It is known in headphone noise-cancellation arrangements to situate a miniature microphone (3), such as for example an electret microphone, on the outer section of each of the left and right headphone shell units (FIG. 1), and this provides the noise cancellation reference signal. (Microphones of this type are essentially omni-directional.) The microphone is typically spaced about 5 cm from the side of the head. As a consequence, the microphone is effectively subjected to two sound sources: firstly, the incoming ambient noise; and secondly, a back-reflected wave from the side of the head. These two waves undergo constructive and destructive wave addition. Consequently, the first (and lowest) destructive frequency at which this occurs is when the waves are exactly out of phase, when their relative displacement corresponds to precisely one-half of a wavelength. So for the example here, where the microphone-to-head distance is 5 cm, the overall path displacement is twice this value (i.e., 10 cm). Destructive interference therefore occurs when the wavelength is 20 cm, corresponding to a frequency of around 1.7 kHz.

In this example it has been assumed that the noise source is normal to the lateral axis through the listener's head (and ears). In practice, the ambient noise is more likely to be present as a "diffuse" sound-field (with equal energy in all directions), and arriving from all directions, not just on-axis. Although this reduces the comb-filtering effect, it is nevertheless still present. The effects are shown in the spectral plot of FIG. 2, which were measured using an electret microphone mounted according to FIG. 1, and with the sound-source at normal incidence. Note the first interference trough just below 2 kHz, and a second at about 4 kHz. The first interference peak can be clearly seen at around 3 kHz.

When a cell-phone or headphone driver unit (1) is held or mounted adjacent to the outer ear (2), an acoustic cavity is formed. This comprises the major outer-ear cavity (the "concha"), which is partially bounded by the hard, reflective surface of the phone itself. This is especially applicable to "pad-on-ear" type phones (circumaural types generally tend to dampen the resonance somewhat).

The consequence of this is that (a) the headphone driver is coupled to—and driving into—a resonant cavity, and (b) the ambient acoustic noise is leaking into the same resonant cavity. The effects are not necessarily the same because the acoustic impedances of the two pathways are very different. Because of its physical dimensions, the cavity will resonate most strongly at several kHz, and hence the incoming noise signal will effectively be boosted at this frequency.

However, the resonant properties are dependent entirely on the acoustic attributes of the cavity, and so differing ear-sizes create differing resonant frequencies and "Q"-factors, as does (to a lesser extent) the nature and proximity of the phone surface which bounds the concha.

In order to compensate for these acoustic phenomena, an appropriate filtering system is created, as follows. The filtering can be carried out either in the analogue domain, using operational amplifiers and known filter configurations, or preferentially in the digital domain using FIR or IIR filters (4). This latter enables better control and allows user-reconfiguration.

Figure 3:
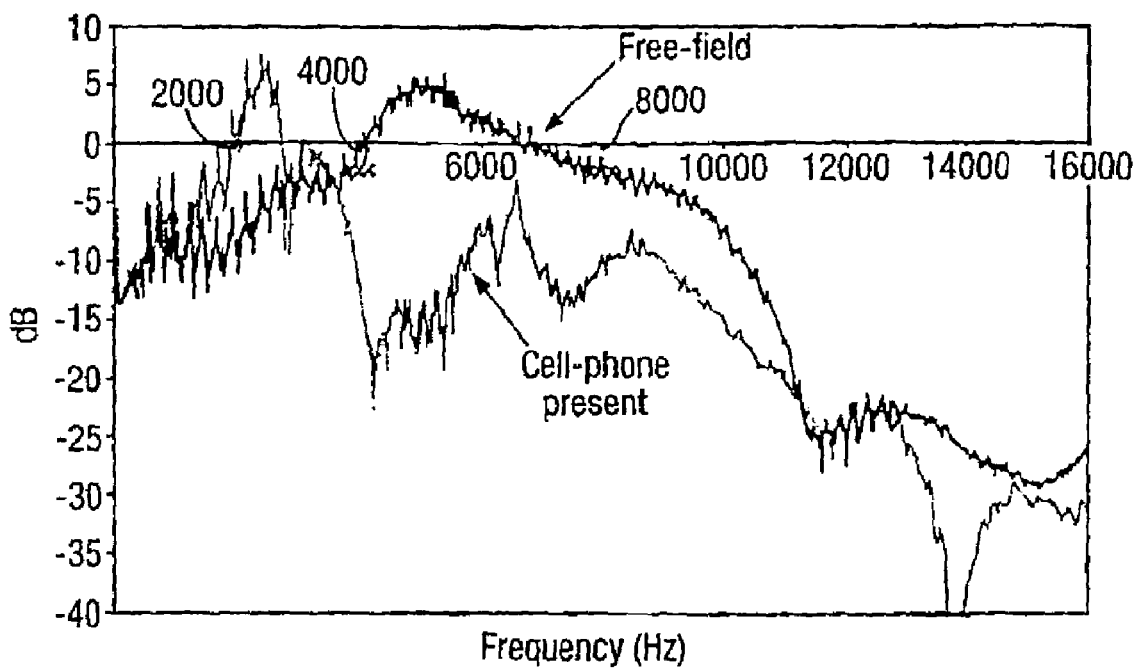
FIG. 3 shows an ear transfer characteristic for two different situations.

FIG. 3 shows two Far Transfer Characteristics (ETCs), which were measured using a B&K type 5930 artificial head. First, the free-field characteristics of one of the ears was measured using an impulse method in which a small loudspeaker was used as the sound-source, placed on-axis to the right ear of the B&K head, at 0.6 m distance so as to substantially avoid standing-wave generation. This is essentially the "near-ear" response of the 90° HRTF (Head-Related Transfer Function). Next, a cell-phone (Ericsson type A-1018S) was held to the ear of the artificial head, in just the position that it would be if a user were listening to it. The measurement was repeated, and yielded the second set of characteristics shown in FIG. 3. Note that both of the FIG. 3 plots have been corrected for the loudspeaker coloration, and that the B&K Head microphone coloration is negligible. The effect of partially occluding the concha is clear to see. The cell-phone has disturbed the primary concha resonance, at about 5.5 kHz, creating a new resonant peak at about 2.4 kHz, and there is also some masking of the higher frequencies between 4 kHz. and 11 kHz.

Figure 4:
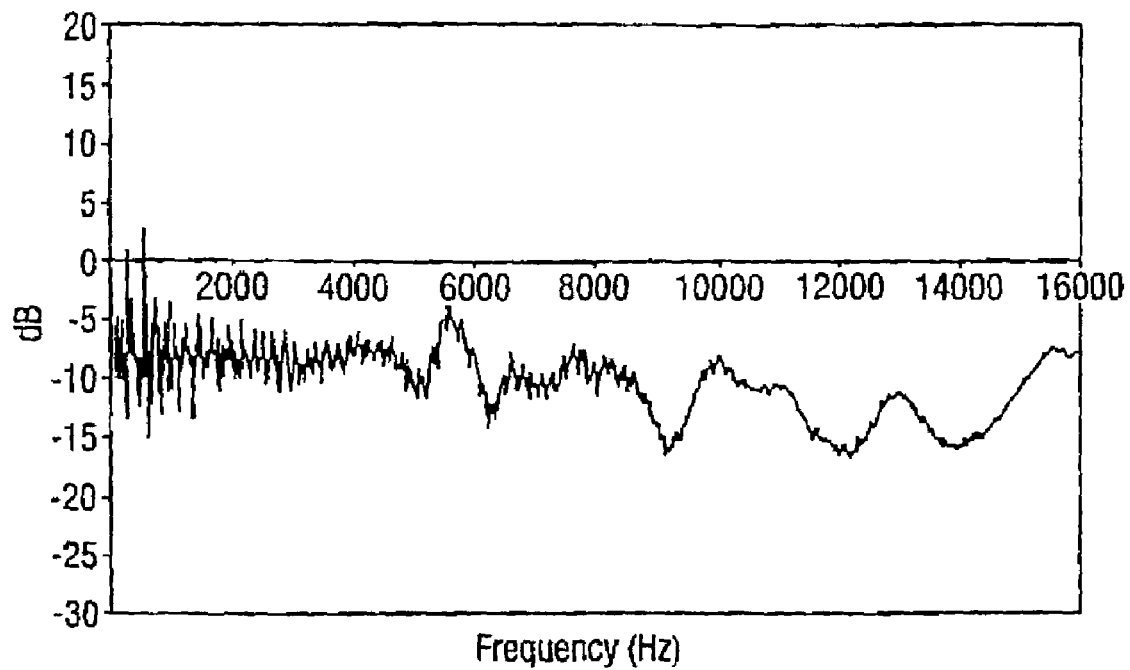
FIG. 4 shows a typical characteristic of a miniature electret microphone.

A low-cost, miniature, electret microphone, as would be used for noise-cancellation, was characterized against a B&K type 4006 studio reference microphone (which has a very smooth, essentially flat frequency-response between 20 Hz and 20 kHz). This indicates the amount of spectral "coloration" that these microphones would introduce into the signal-processing chain. The measurements were made in a quiet environment using an impulse method. The spectral characteristics of the microphone are shown in FIG. 4 (note that the coloration of the loudspeaker used for these measurements has also been subtracted). The microphone exhibits a relatively "flat" response for such a low cost item.

Figure 5:
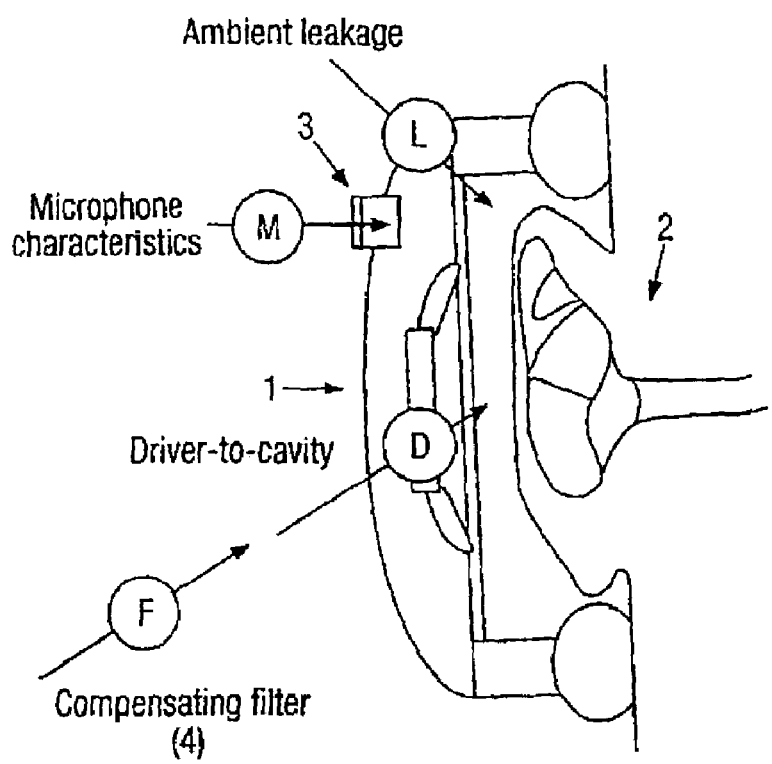
FIG. 5 shows the transfer functions associated with various parts of a headphone system.

FIG. 5 shows the relevant transfer functions associated with the various acoustic and electrical sip al pathways into the headphone shell. Function L represents the overall acoustic pathway from an external sound-field through the shell bulk and also via the parallel leakage around the edges of the cushion. For a mobile phone, where the handset is only loosely in contact with the pinna, this latter is the predominant of the two. Function M represents the spectral characteristics of the external microphone which is used to pick-up the external ambient noise signal, including the associated acoustic modification (comb-filtering) by the closeness of the head (refer to previous text). Function D represents the overall transfer function into the outer-ear cavity via the electrical transducer drive-unit, and function F represents a separate signal-processing is filter which is to be used serially with D in order to accomplish optimal noise cancellation. It is now possible to define the various signal pathways and calculate what the transfer function F will be for optimal cancellation.

First, if the external, ambient, noise sound-field is denoted by: {NOISE}, and the electrical input to the headphone driver {INPUT}, then the ambient noise present in the cavity is:

Noise in cavity={NOISE}*[L]     (1)

Next, the electrical delivery path into the cavity via the driver can be defined to be:

Electrical delivery={INPUT}*[D]*[F]     (2)

And, of course, the noise pick-up microphone has the transfer function:

Microphone=[M]     (3)

For effective noise cancellation, we define that the serial noise-measurement and electrical delivery paths must deliver a signal which is equal and opposite to the noise signal in the cavity, thus:

{NOISE}*[M]*[D]*[F] must be equal & opposite to
{NOISE}*[L]     (4)

i.e.{NOISE}*[M]*[D]*[F]=−1*{NOISE}*[L]     (5)

and therefore $$[F] = \left\{ \frac{-NOISE*[L]}{NOISE*[M]*[D]} \right\} = \left\{ \frac{-[L]}{[M]*[D]} \right\} \quad (6)$$

This has now defined the filter function [F], required to process the incoming noise signal so as to create optimal cancellation in the headphone cavity.

Figure 2:
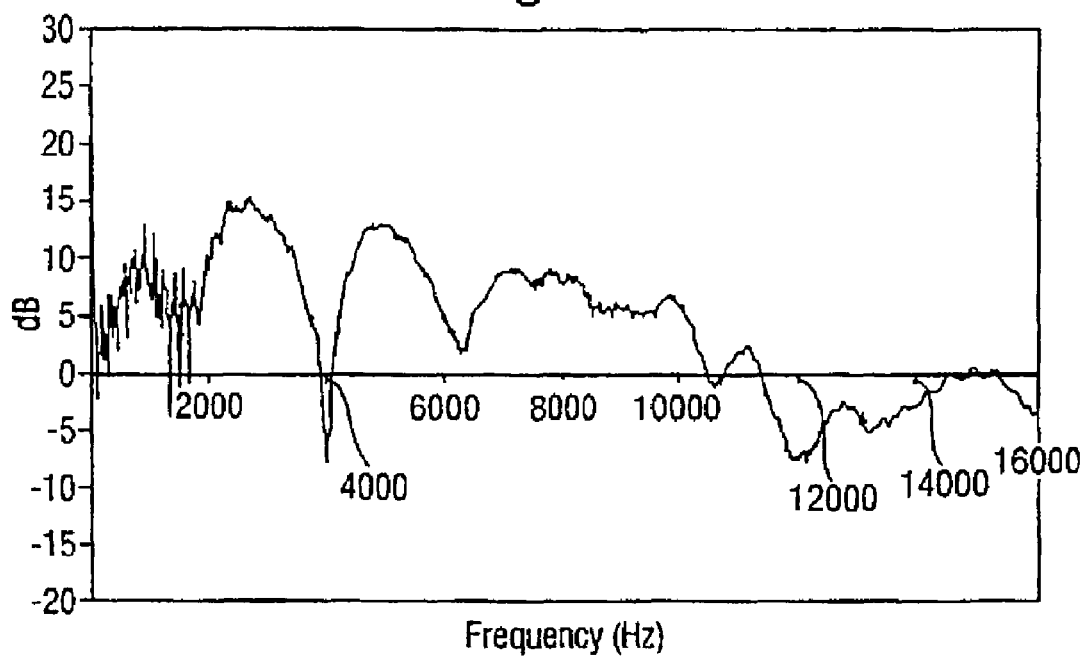
FIG. 2 shows the effect of head proximity on a headphone mounted microphone.

Some of the above transfer functions have been shown in earlier Figures. Typical microphone characteristics, M, including the head-proximity comb-filtering effects, are depicted in FIG. 2, and the ambient leakage characteristics, L, of a cell-phone are shown in FIG. 3 ("cell-phone present"). Clearly, the required filtering F is dependent on several physical factors, and will vary according to their dimensions and configuration. In order to depict the nature of a typical filter factor F, the following example uses data relating to a pad-on-ear headphone (which is similar to a cell-phone in terms of outer-ear interaction, and it is conveniently accessed electrically).

Figure 6:
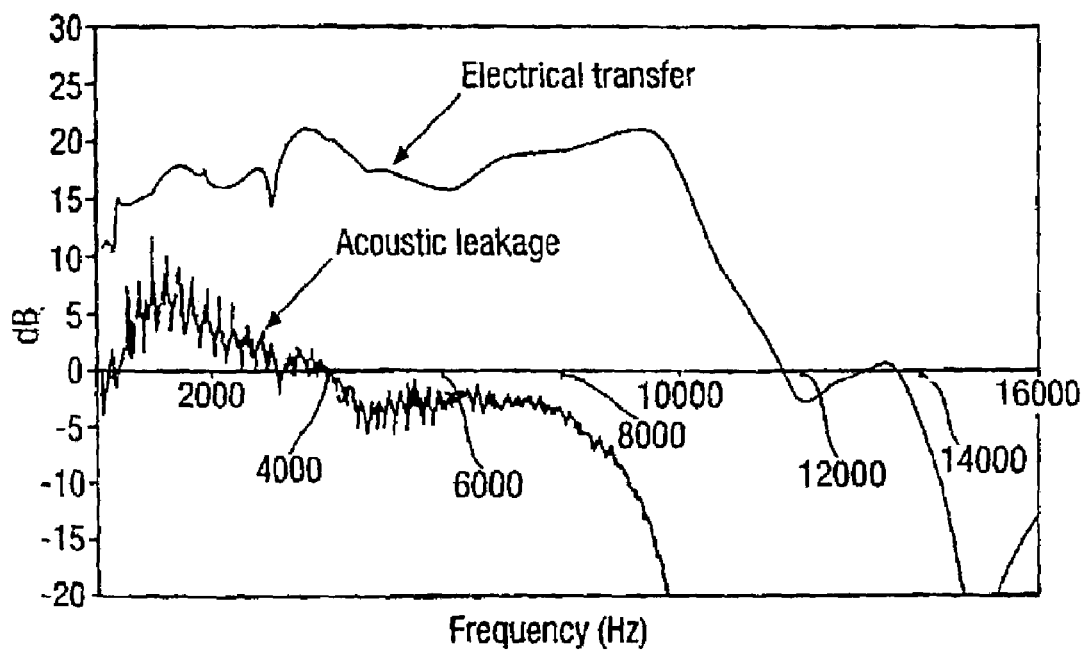
FIG. 6 shows the transfer characteristics measured for a pad on ear type phone for direct electrical signals and leakage of ambient noise signals.

FIG. 6 shows data from measurements made using a pair of mid-price, pad-on-ear type headphones mounted on a B&K head. The acoustic leakage was obtained using the same method as described earlier for the cell-phone, and the electro-acoustic transfer function was obtained by driving an impulse directly into the phone, and measuring the signal from the relevant artificial head microphone. These particular phone characteristics are relatively flat, which is quite unusual.

Figure 7:
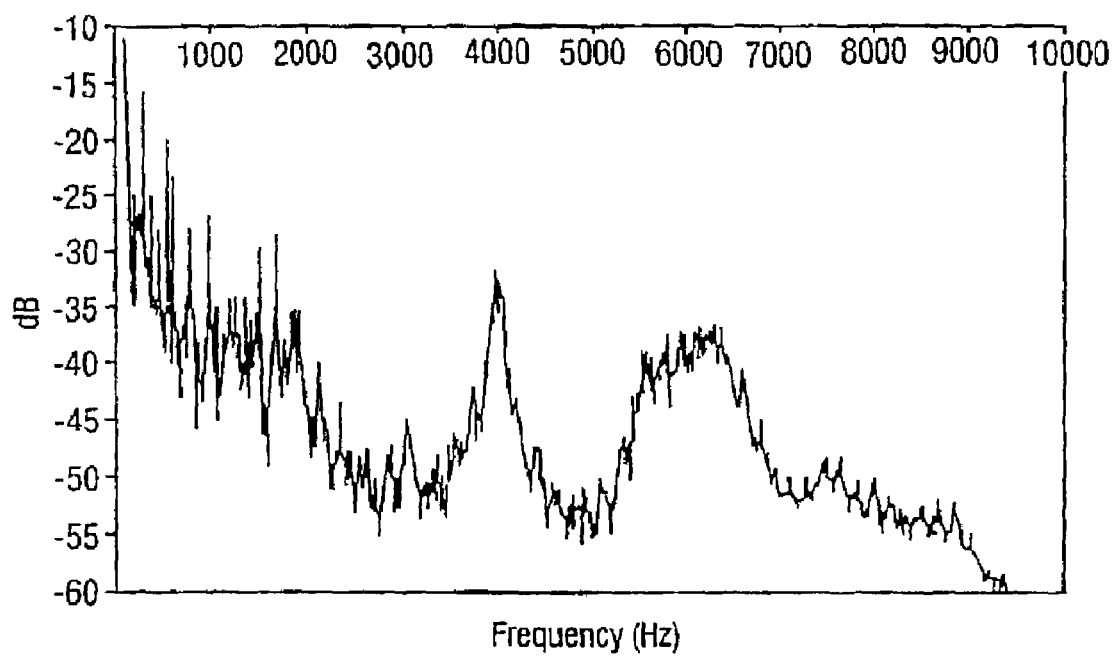
FIG. 7 shows a filter transfer function computed to compensate for the features 20 shown in FIG. 6.

FIG. 7 shows a filter characteristic [F] according to equation 6, based on the data of FIGS. 6 and 2. Note that the frequency scale has been expanded to show only 0 to 10 kHz, as this is practical region of operation, bearing in mind the day-to-day physical differences which can occur when placing the phone against the ear, and the present bandwidth limitations of telephony (<4 kHz). The data plotted in FIG. 7 have accrued some noise because of the combined number of sources used for its calculation, but it can be seen that there are several main features: (a) a 10 dB fall between 0 and 600 Hz; (b) a flat region between 600 Hz and 2 kHz; and (c) a broad trough between 2 kHz and 4 kHz. However, there is little significance, if any, in this particular shape: it is merely the combination of the factors of its constituent components.

It will be appreciated that the filtering [F] will need to match not only the to amplitude characteristics of the entrained ambient noise [L], but that is also has corresponding phase characteristics. This can be achieved using either FIR filters or IIR filters.

As the outer-ear is one of the primary influencing factors in the invention, the physically-related parameters can be "tuned" so as to match each individual's ears. This applies to (a) the leakage characteristics, and especially to the size and position of the resonant peak (part FIGS. 3 and 6); and (b) the electro-acoustic phone-to-ear transfer characteristic (FIG. 6).

This enables the application of the "Virtual Ear" tailoring-type approach to the modification of filter parameters, as described in our co-pending patent application number EP 1 058 481, which is incorporated herein by reference. Either a series of "set-up" tests, or, alternatively, a range of pre-set values can be provided for the user to switch through and select the optimal. (The latter is probably more convenient.) A computer located remote from the phone or processing means present in the phone could, for example, carry out (and optimize) the set-up, and then program the parameters for the individual user. The final compensation filter [F] will also be dependent on the phone dimensions and structure, and is it is likely that each different phone type will have slightly different characteristics in this respect. However, these are trivial to measure and program. If an external computer is used, it can advantageously provide via a separate sound generation means an ambient noise signal (such as white or pink noise) in which a broad band of frequencies is present, in order to aid full optimization.

Figure 8:
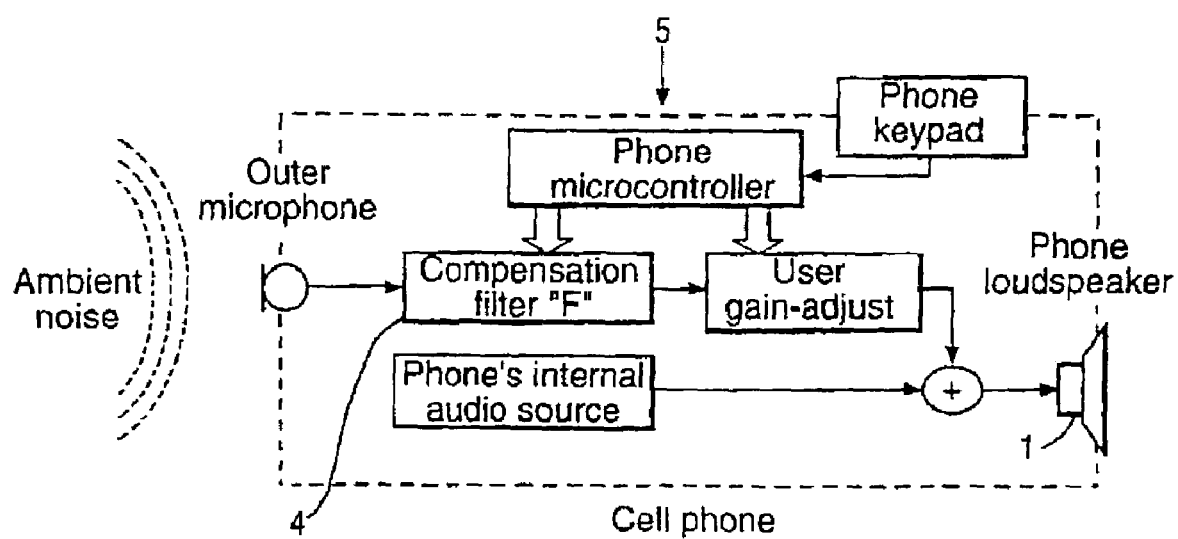
FIG. 8 shows a block diagram of a noise cancellation system according to the present invention.

FIG. 8 shows a block diagram of a telephone, in the present example a cell-phone. The incoming, ambient noise is picked up by the outer microphone on the cell-phone handset, and then it is processed by compensation filter F (which includes the inversion factor). Next, it is passed through a gain-adjust stage, such that the user can fine-tune the cancellation level, passed to a summing drive amplifier, and thence to the internal phone loudspeaker. The phone's internal audio source (i.e., from the radio receiver) is also fed to the summing drive amplifier. A micro-controller integrated-circuit is used to control the parameters of the compensation filter, F, such that they can be adjusted to suit the individual's outer-ear characteristics, as has been described. The micro-controller, in turn, is connected to the keypad of the telephone, such that the user can make the necessary adjustments (including the gain adjust, above).

Figure 9:
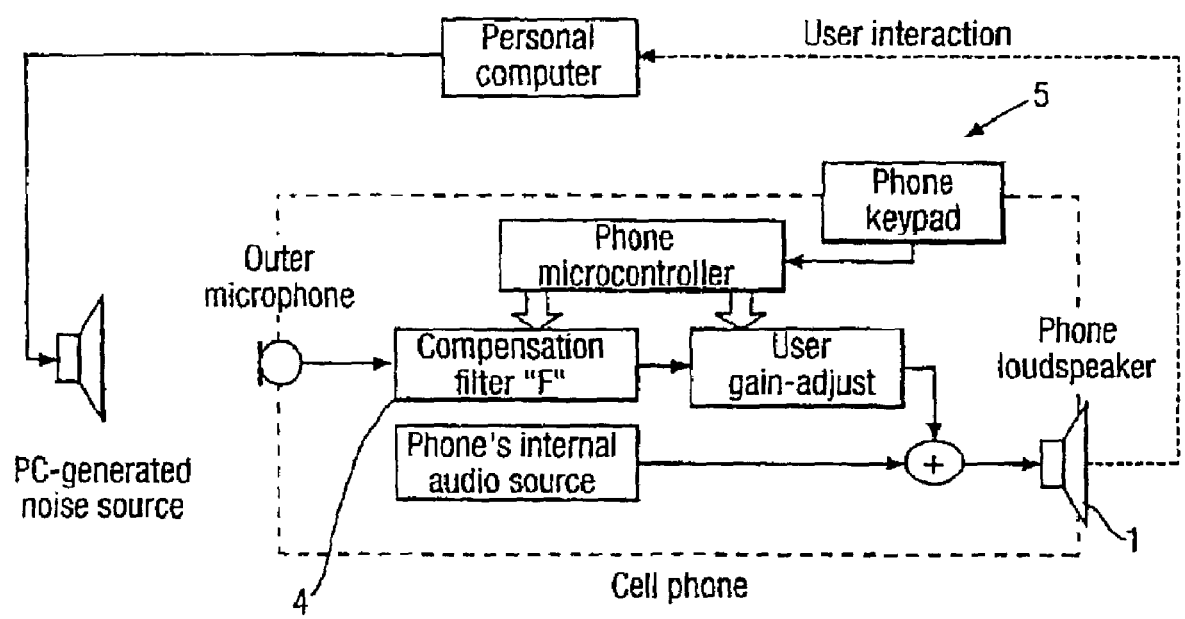
FIG. 9 shows a system for programming the transfer function of a programmable filter in a noise reduction system.

FIG. 9 shows a block diagram of a method of calibrating the system to an individual user by means of a personal computer (PC). The system is substantially as shown in FIG. 8, with the addition of a PC which is digitally connected to the phone's micro-controller, either directly via a serial or parallel cable, or indirectly via radio or optical means. The user listens to a test signal from the phone loudspeaker, representative of a distant caller, whilst the computer creates ambient noise signal and feeds this to one of its loudspeakers. By adjusting the filter parameters, or, alternatively, selecting from a number of available pre-set filter functions, the user can set-up the optimal signal processing configuration for their own personal physiological characteristics. The use of a PC is convenient because it allows much more precise control of adjustment via its mouse and cursor control keys than the small phone keypad, which is also in an inconvenient position very close to the listener's head. Of course, the micro-controller could be used to perform the programming itself in a less preferred embodiment. The computer can be used to store individual preferences, and provides a more sophisticated method of interaction with the cell-phone. In both FIG. 8 and FIG. 9 the signal processing apparatus is denoted by the reference numeral 5.

Finally, the content of the priority document, especially the drawings, is incorporated herein by reference.

The invention claimed is:

1. A method of improving the audibility of sound from a loudspeaker located close to an ear, comprising the steps of detecting ambient acoustic noise arriving from other sound sources using a transducer that provides corresponding ambient sound signals;
   inverting the polarity of said ambient sound signals and combining them with the signals being fed to the loudspeaker to reduce the audibility of said ambient acoustic noise;
   passing said ambient sound signals through a filter having a predetermined average transfer function that compensates for the spectral modification of sounds travelling from the loudspeaker to the ear caused by the proximity of the loudspeaker to the ear of a listener in use.

2. The method of claim 1 wherein the transfer function also compensates for the spectral modification of the detected ambient noise sound signal caused by the proximity of the transducer to the head of a listener in use.

3. The method of claim 1 in which the transfer function also compensates for the modification of the ambient noise sound signal caused by the proximity of the loudspeaker to the ear of a listener in use.

4. The method of claim 1 in which the transfer function is one of a plurality of transfer functions which are user-selectable in use.

5. The method of claim 1 wherein the filter is an FIR or IIR filter.

6. An apparatus for improving the audibility of sound from a loudspeaker located close to an ear, comprising:
   a headphone system;
   acoustic noise reduction means comprising a filter, the filter having a predetermined transfer characteristic that compensates for the spectral modification of sounds travelling from the headphone to the ear caused by the proximity of the headphone to the ear of a listener in use.

7. The apparatus of claim 6 having a ambient acoustic noise reduction means including a transducer for detecting ambient acoustic noise, and a filter having a predetermined transfer characteristic which compensates for the spectral modification of the detected ambient acoustic noise caused by the proximity of the transducer to the head of a listener in use.

8. The apparatus of claim 6 in which the filter also compensates for the modification of the ambient noise sound signal caused by the proximity of the loudspeaker to the ear of a listener in use.

9. The apparatus of claim 6 wherein said headphone system is a telephone.

10. A system for programming the transfer function of a programmable filter in a noise reduction system for improving the audibility of sound from a loudspeaker located close to an ear comprising:
    a transducer located close to said loudspeaker for detecting ambient sound signals; and
    signal processing means comprising:
    means to invert the polarity of said ambient sound signals and combine them with the signals being fed to the loudspeaker;
    a sound source for generating ambient sounds over a range of frequencies, the sound source being remote from the loudspeaker; and
    control means for providing a plurality of user-selectable transfer functions which can be programmed into the programmable filter such that a user can select the optimum transfer function in use wherein the user-selectable transfer functions provide compensation for at least spectral modification of sounds travelling from the loudspeaker to the ear caused by the proximity of the loudspeaker to the ear of a listener.

11. The system as recited in claim 10 wherein the user-selectable transfer functions further provide compensation for modification of the ambient noise sound signal caused by the proximity of the loudspeaker to the ear of a listener in use.

* * * * *